(12) United States Patent
Stephenson et al.

(10) Patent No.: US 10,220,605 B2
(45) Date of Patent: Mar. 5, 2019

(54) EDGE BREATHERS FOR COMPOSITE PRODUCTS

(71) Applicant: The Boeing Company, Chicago, IL (US)

(72) Inventors: Benjamin Jeffrey Stephenson, Seattle, WA (US); John R. Aubin, Seattle, WA (US); Jake Adam Reeves, Newcastle, WA (US); William Stahl Hollensteiner, Kent, WA (US)

(73) Assignee: The Boeing Company, Chicago, IL (US)

( * ) Notice: Subject to any disclaimer, the term of this patent is extended or adjusted under 35 U.S.C. 154(b) by 438 days.

(21) Appl. No.: 14/936,870

(22) Filed: Nov. 10, 2015

(65) Prior Publication Data

US 2017/0129195 A1 May 11, 2017

(51) Int. Cl.
| | | |
|---|---|---|
| *B29C 71/00* | (2006.01) | |
| *B29C 67/00* | (2017.01) | |
| *B29C 71/02* | (2006.01) | |
| *B33Y 80/00* | (2015.01) | |
| *B33Y 10/00* | (2015.01) | |
| *B29C 70/44* | (2006.01) | |
| *B29C 70/54* | (2006.01) | |
| *B29C 37/00* | (2006.01) | |
| *B29K 105/00* | (2006.01) | |
| *B29L 31/00* | (2006.01) | |

(52) U.S. Cl.
CPC .......... *B33Y 80/00* (2014.12); *B29C 37/0064* (2013.01); *B29C 70/44* (2013.01); *B29C 70/54* (2013.01); *B33Y 10/00* (2014.12); *B29K 2105/0058* (2013.01); *B29L 2031/737* (2013.01)

(58) Field of Classification Search
CPC ......... B33Y 80/00; B33Y 10/00; B29C 70/44; B29C 37/0064; B29C 70/54; B29L 2031/737; B29K 2105/0058
See application file for complete search history.

(56) References Cited

U.S. PATENT DOCUMENTS

| | | | |
|---|---|---|---|
| 8,298,473 B2 | 10/2012 | Dull et al. | |
| 2013/0113142 A1* | 5/2013 | Dull ...................... | B29C 70/342 264/511 |

OTHER PUBLICATIONS

Airtech, Advanced Materials Group, Data Sheet, AIRWEAVE, Non-Woven Polyester, Breathers/Bleeders, Huntington Beach, CA, Jul. 26, 2005.

(Continued)

*Primary Examiner* — Robert J Grun
(74) *Attorney, Agent, or Firm* — Duft & Bornsen, PC (57) ABSTRACT

Systems and methods are provided for curing composite products. One exemplary embodiment is an edge breather for composite manufacturing. The edge breather is formed of a rigid material and includes an elongated body having a top open structure with a cross section that defines an arch. The edge breather also includes hollow passageways within the elongated body that are underneath the top structure and travel along a length of the elongated body. The top open structure defines multiple openings forming an open mesh through which air may enter.

31 Claims, 10 Drawing Sheets

(56) References Cited

OTHER PUBLICATIONS

MTI hose—How it Works in the Resin Infusion Process, GA Composites, https://www.youtube.com/watch?v=oXf6YsVJ8w4, Oct. 5, 2015.
MTI hose—German Advanced Composites, Successful Product Launch, MTI Honoured with Innovation Award, Oct. 6, 2015.
Space Frame, https://en.wikipedia.org/wiki/Space_frame, Oct. 6, 2015.

* cited by examiner

EDGE BREATHERS FOR COMPOSITE PRODUCTS

FIELD

The disclosure relates to the field of manufacturing, and in particular, to composite vacuum bag manufacturing processes.

BACKGROUND

Many composite products (e.g., carbon fiber products, such as aircraft wings) are manufactured via vacuum bag manufacturing processes. Using these techniques, layers of material are placed onto each other, and are cured to harden into a composite part. In order to ensure that the layers harden into the correct shape, the layers are placed within a vacuum bag. The vacuum bag applies pressure to contour and consolidate the layers against the surface of a working tool, and to remove volatile compounds present within the layers.

As a part of this process, components known as breathers are placed proximate to the composite product. These breathers provide a passageway for air and gaseous volatiles to exit the vacuum bag. However, the industry continues to seek out enhanced designs for breathers that decrease cost and/or increase quality.

SUMMARY

Embodiments described herein include enhanced edge breathers for composite parts. In particular, the edge breathers are designed as truss-like frames that define open channels for air to flow through. These frames are also capable of bearing load from a vacuum bag during curing of a product (e.g., at 90 pounds per square inch (PSI), in an autoclave), and without damaging the vacuum bag.

One exemplary embodiment is an edge breather for composite manufacturing. The edge breather is formed of a rigid material and includes an elongated body having a top open structure with a cross section that defines an arch. The edge breather also includes hollow passageways within the elongated body that are underneath the top structure and travel along a length of the elongated body. The top open structure defines multiple openings forming an open mesh through which air may enter.

Another exemplary embodiment is an edge breather for composite manufacturing, formed of a rigid material. The edge breather includes an elongated body having a top open structure with a cross section that defines an arch. Hollow passageways within the elongated body are underneath the top structure and travel along a length of the elongated body. The top open structure defines multiple openings forming an open mesh through which air may enter.

Another embodiment is a composite manufacturing system. The system includes a rigid tool, and an edge breather atop the rigid tool. The edge breather includes a base and a plurality of support members protruding from the base. The edge breather further includes a plurality of lateral members interconnecting portions of the support members that are distal from the base, forming a patterned structure over the base. The system also includes a surface breather laid atop the edge breather, and a vacuum bag sealing the edge breather, the surface breather, and a portion of the tool from surrounding atmosphere.

A further embodiment is method for manufacturing a composite product. The method includes placing a composite charge on a tool, locating edge breathers along the perimeter of the charge, and creating a vacuum chamber around the charge and edge breathers. The method further includes drawing a vacuum in the vacuum chamber, and drawing gases from the composite charge past a support member protruding from a base of the edge breathers.

A further embodiment is a method for fabricating an edge breather. The method includes heating a structural material into a liquid, laying the liquid to form a base, and waiting for the base to solidify. The method further includes laying the liquid iteratively in a pattern to form a plurality of support members protruding from the base, each support member comprising a portion proximate to the base and a portion distal from the base, and laying the liquid in a pattern to form a plurality of lateral members interconnecting the distal portions of the support members, forming an open patterned structure above the base. Additionally, the method comprises waiting for the liquid to solidify into a completed edge breather.

A further embodiment comprises an edge breather for composite manufacturing. The edge breather includes an arcuate, rigid open patterned structure, comprising a plurality of interconnecting lateral members, through which gas is freely capable of flowing into and out of during a vacuum bag composite manufacturing process.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
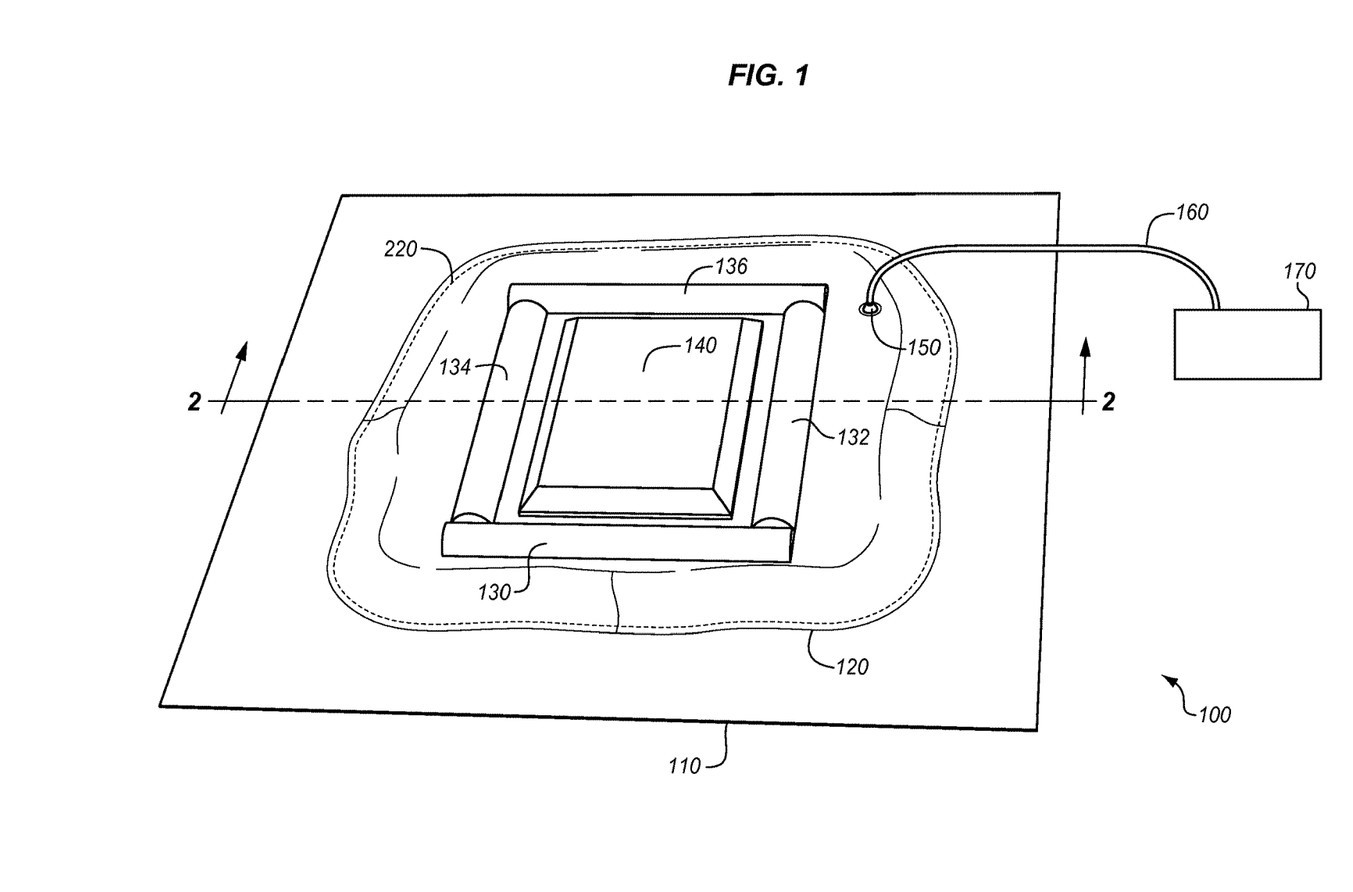
FIG. 1 is a block diagram of a vacuum bag manufacturing system in an exemplary embodiment.

FIG. 1 is a block diagram of a vacuum bag manufacturing system 100 in an exemplary embodiment. System 100 comprises any combination of components and/or devices that are capable of utilizing vacuum bag techniques to consolidate and/or cure a composite part (e.g., a fiber reinforced composite part such as an aircraft wing or any other suitable component). System 100 has been enhanced to utilize edge breathers (130, 132, 134, 136) which resist pressure and heat during the curing process (e.g., hundreds of ° F. and/or 90 PSI), and that also define internal passageways that air and volatile gases may enter and then travel through in order to exit system 100 (e.g., via vacuum hose 160).

In this embodiment, system 100 includes rigid tool 110, which forms a surface about which part 140 conforms to during manufacturing. As shown in FIG. 1, part 140 is held in place on tool 110 via vacuum bag 120, which is taped/sealed via edge sealant 220 to tool 110, and covers tool 140, as well as edge breathers 130, 132, 134, and 136. The edge breathers (130, 132, 134, 136) provide passageways for air and volatile gases from the curing process to travel within vacuum bag 120. These volatile gases then exit vacuum bag 120 via port 150, which operates as a fitting for vacuum line 160. Vacuum line 160 is powered in this embodiment by compressor 170.

While in operation in one embodiment, compressor 170 may generate about one atmosphere of negative pressure on vacuum bag 120. This presses vacuum bag 120 against part 140 to conform part 140 to tool 110. This also causes vacuum bag 120 to tightly conform to the edge breathers (130, 132, 134, 136). This provides a benefit in holding part 140 tightly against the contours of tool 110 as part 140 cures, and also provides a benefit in that it rapidly draws out volatile gases and air bubbles that would otherwise be formed during the curing process. The curing process itself may further involve the application of substantial amounts of pressure and/or heat. Edge breathers (130, 132, 134, 136) of system 100 have been enhanced to exhibit a geometry that resists collapse under the pressure applied by vacuum hose 160. Further details of the edge breathers (130, 132, 134, 136) will be described with regard to FIGS. 7-10 below, while further details of the operation of system 100 will be described with regard to FIGS. 2-5.

Figure 2:
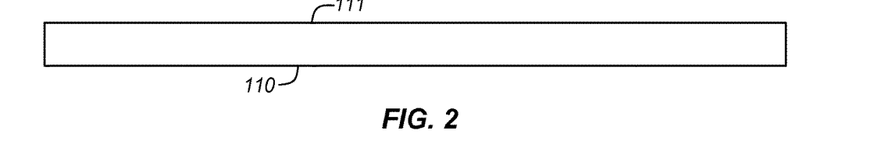
FIGS. 2-5 are section cut views illustrating preparation of a vacuum bag manufacturing system in an exemplary embodiment.

FIGS. 2-5 are section cut side views of system 100, as system 100 is assembled in an exemplary embodiment. This view is represented by element 2 of FIG. 1. Further description of system 100 will therefore be provided with respect to FIGS. 2-5, which discuss the order in which various components may be assembled in order to facilitate vacuum bag manufacturing. FIG. 2 illustrates tool 110 in a resting state. The top surface 111 of tool 110 may be coated with a release agent in order to ensure that parts placed atop tool 110 do not bind to tool 110 during and/or after the curing process.

Figure 3:
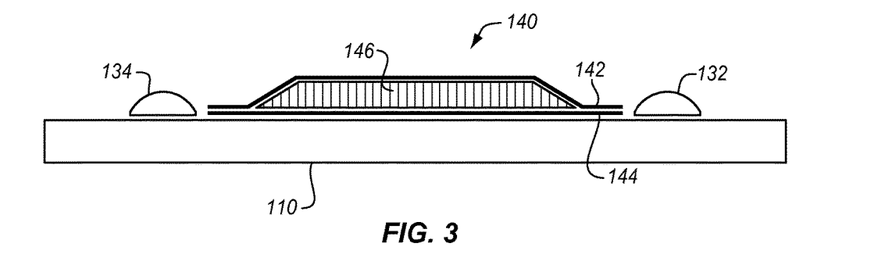

In FIG. 3, edge breathers (e.g., 132, 134) are placed onto tool 110, as is part 140 (which in this embodiment consists of layers/plies 142 and 144, as well as core 146, although in further embodiments a solid laminate composite charge may take the place of core 146). Any suitable composite structure may be utilized for part 140. Edge breathers 132 and 134 are placed proximate to part 140, and act as lanes for air proximate to part 140 to be sucked away from part 140. This ensures that air bubbles (not shown) will not interfere with the curing of part 140.

Figure 4:
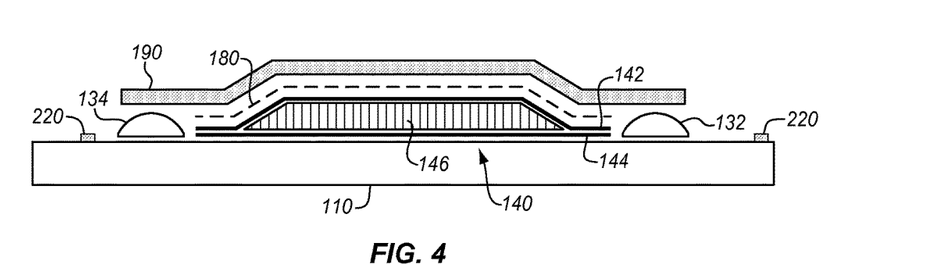

FIG. 4 illustrates that an edge sealant 220 (e.g., a double sided tape) has been applied onto tool 110 at the periphery of the edge breathers (e.g., 132, 134), and further illustrates the application of parting film 180 to part 140, as well as the application of a surface breather 190 atop parting film 180, and edge breathers 132 and 134. Parting film 180 may comprise a permeable Teflon layer that prevents part 140 from sticking to other components. The edge breathers (130, 132, 134, 136), in combination with surface breather 190, form passageways for air and volatile gases to exit part 140 before and/or during curing, safely being transported away. Specifically, surface breather 190 provides a porous lane through which air may travel to exit the system.

Figure 5:
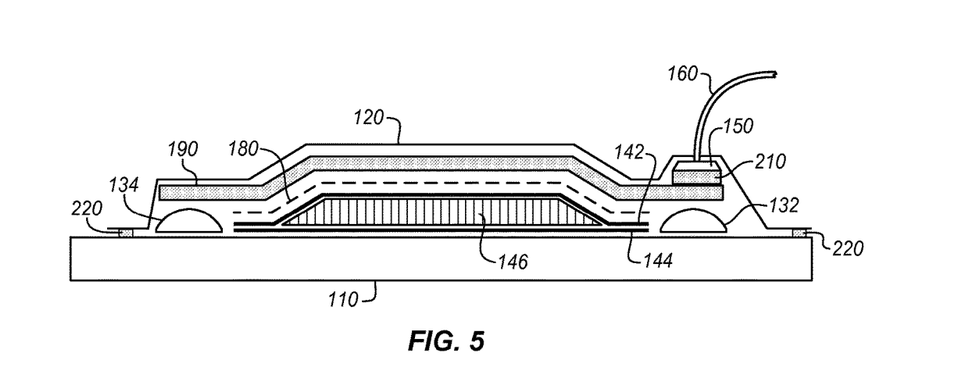

According to FIG. 5, part 140 is covered by parting film 180. Surface breather 190 and the components beneath it are sealed onto tool 110 by vacuum bag 120, which is attached via edge sealant 220 to tool 110. Probe pad 210 provides a small breather channel proximate to fitting 150, to which vacuum hose 160 is attached. Vacuum hose 160 may then draw out air from vacuum bag 120, thereby pressing part 140 onto tool 110. Heat and/or pressure may then be applied to cure/harden part 140.

The process of adding and curing a lay up onto to part 140 as shown in FIGS. 2-5 may continue as an iterative process to add and cure multiple layers, wherein new "green" layers are added to part 140 and cured, and then further new "green layers" are added again. Utilizing this technique a manufacturer may add, for example, several thousands of an inch of thickness to part 140 at a time, until part 140 is completed.

Illustrative details of the operation of system 100 will be discussed with regard to FIG. 6. Assume, for this embodiment, that part 140 is ready to be cured but has not yet been placed onto tool 110.

Figure 6:
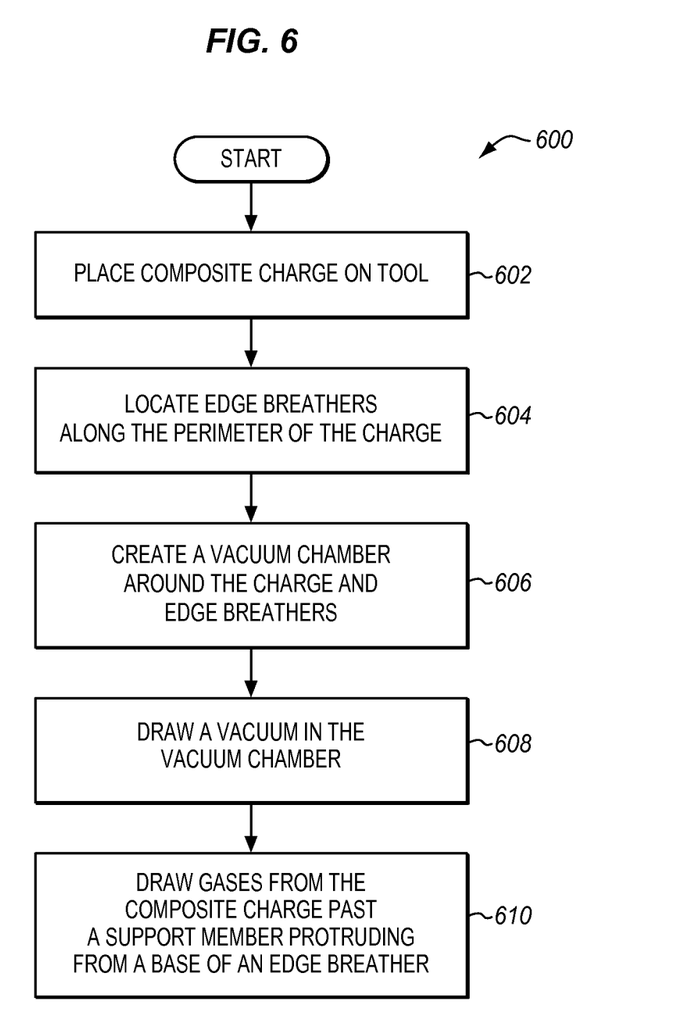
FIG. 6 is flowchart illustrating a method for utilizing a vacuum bag manufacturing system in an exemplary embodiment.

FIG. 6 is a flowchart illustrating a method 600 for utilizing a vacuum bag manufacturing system 100 in an exemplary embodiment. The steps of method 600 are described with reference to system 100 of FIG. 1, but those skilled in the art will appreciate that method 600 may be performed in other vacuum bag manufacturing systems. The steps of the flowcharts described herein are not all inclusive and may include other steps not shown. The steps described herein may also be performed in an alternative order.

According to FIG. 6, part 140 (comprising a composite charge) is placed/laid on top of tool 110 (step 602). Edge breathers (130, 132, 134, 136) conforming with the enhanced geometry described for example at FIGS. 7-10 are then selected for use with part 140, and are placed/located along the perimeter of the composite charge (step 604). For example, these edge breathers (130, 132, 134, 136). A vacuum chamber comprising vacuum bag 120 is then created around the composite charge and the edge breathers (130, 132, 134, 136), as described above with respect to FIGS. 2-5 (step 606). A vacuum is drawn in the vacuum chamber via vacuum hose 160 (step 608), and gases are drawn from the composite charge past a support member protruding from a base of an edge breather 132. The nature of edge breather 132, as well as support members and a base of edge breather 132, are described in detail below. Part 140 may also be cured (e.g., via the application of heat and/or pressure to a curing agent/resin inside of part 140) in order to harden part 140 into an integral whole.

Figure 7:
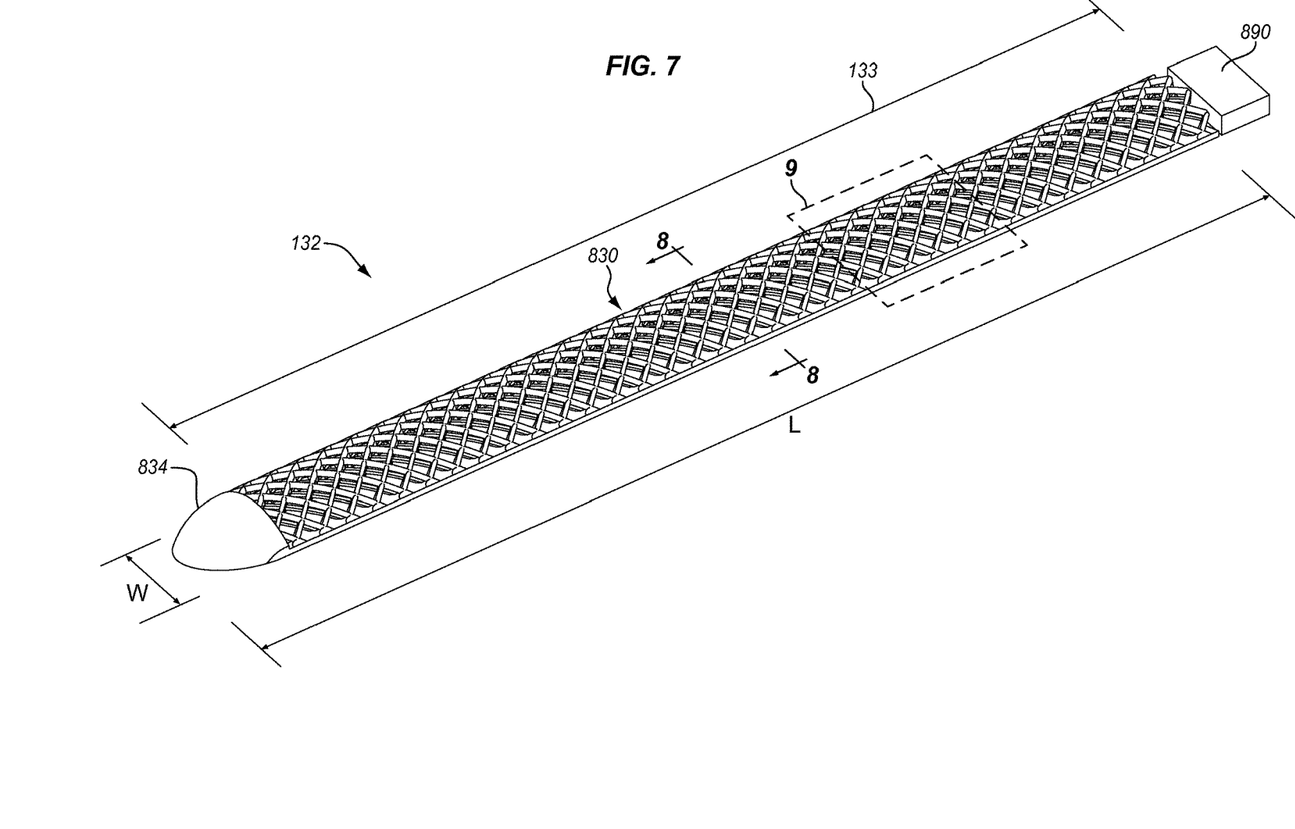
FIG. 7 is a perspective view of an edge breather in an exemplary embodiment.
Figure 8:
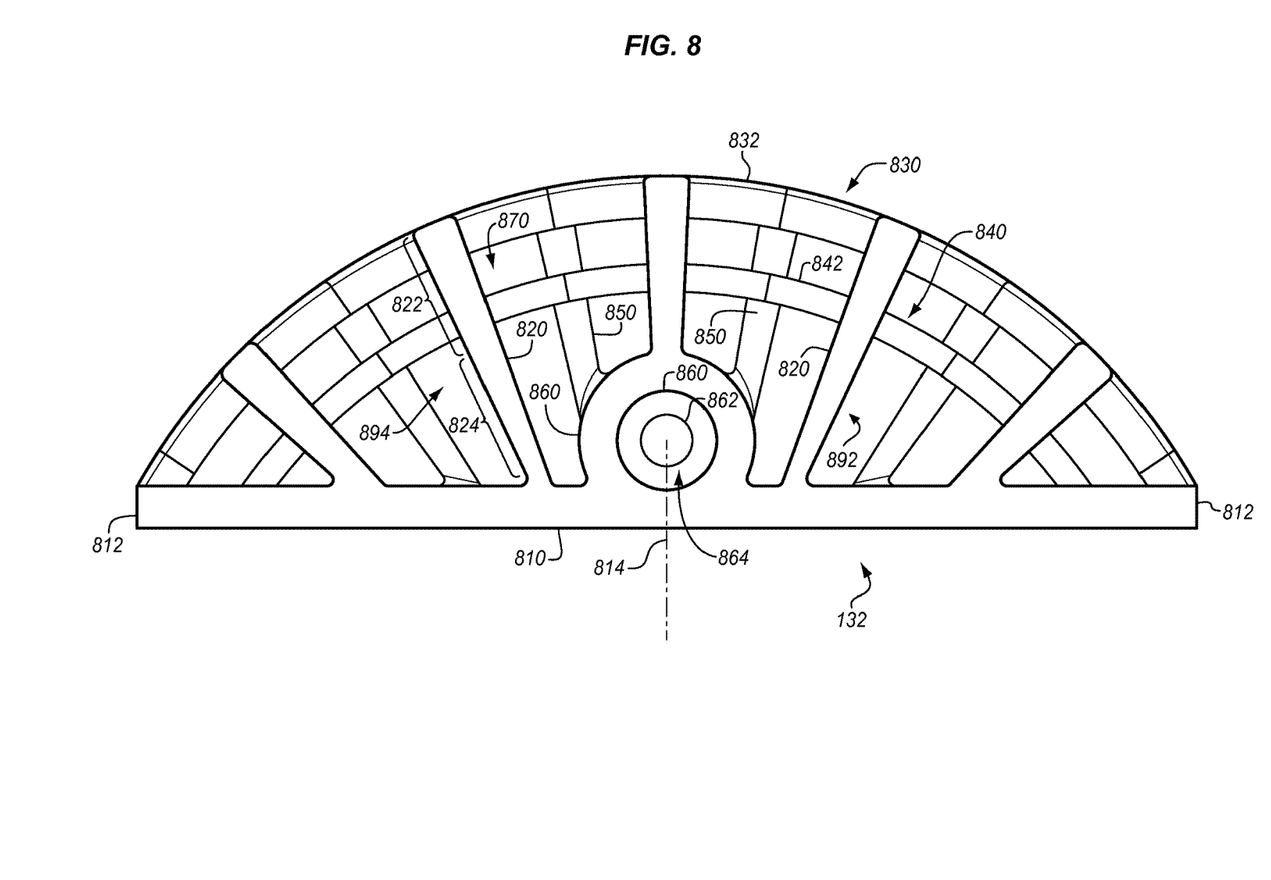
FIG. 8 is a section cut view of an edge breather in an exemplary embodiment.
Figure 9:
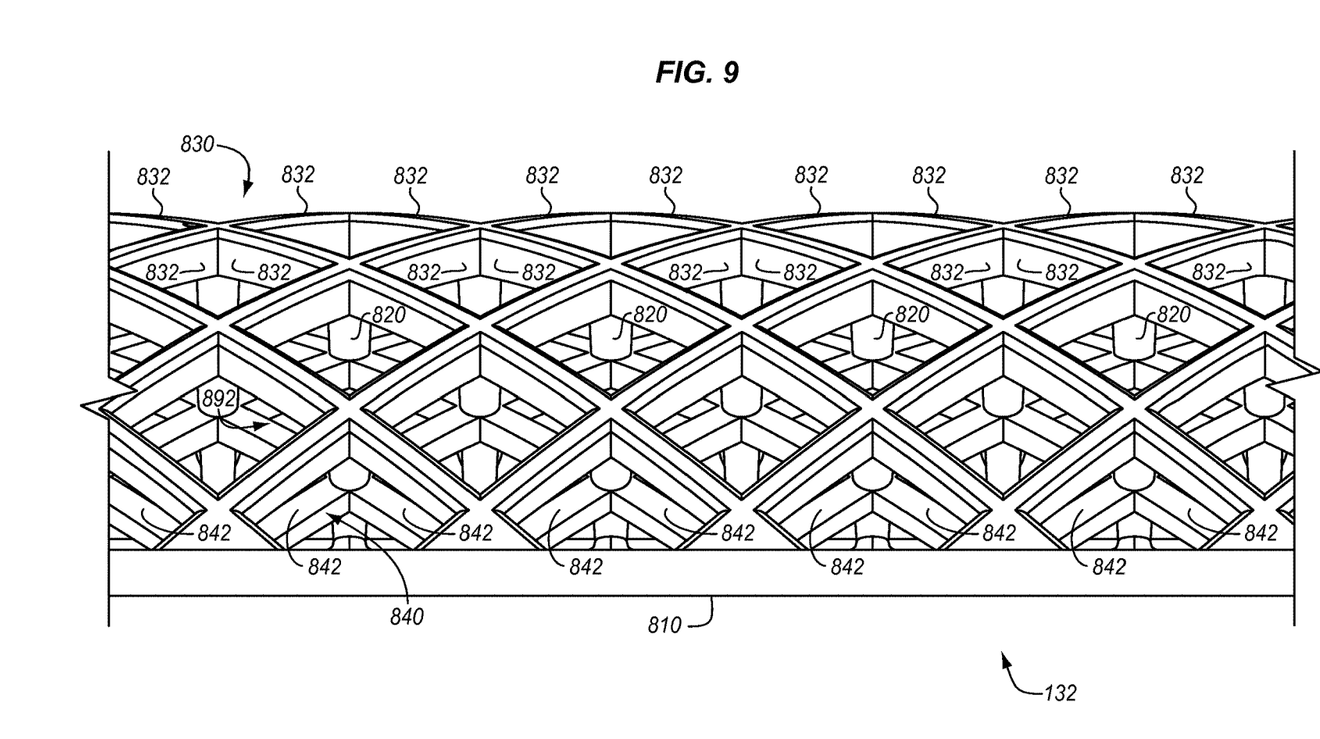
FIG. 9 is a side view of an edge breather in an exemplary embodiment.
Figure 10:
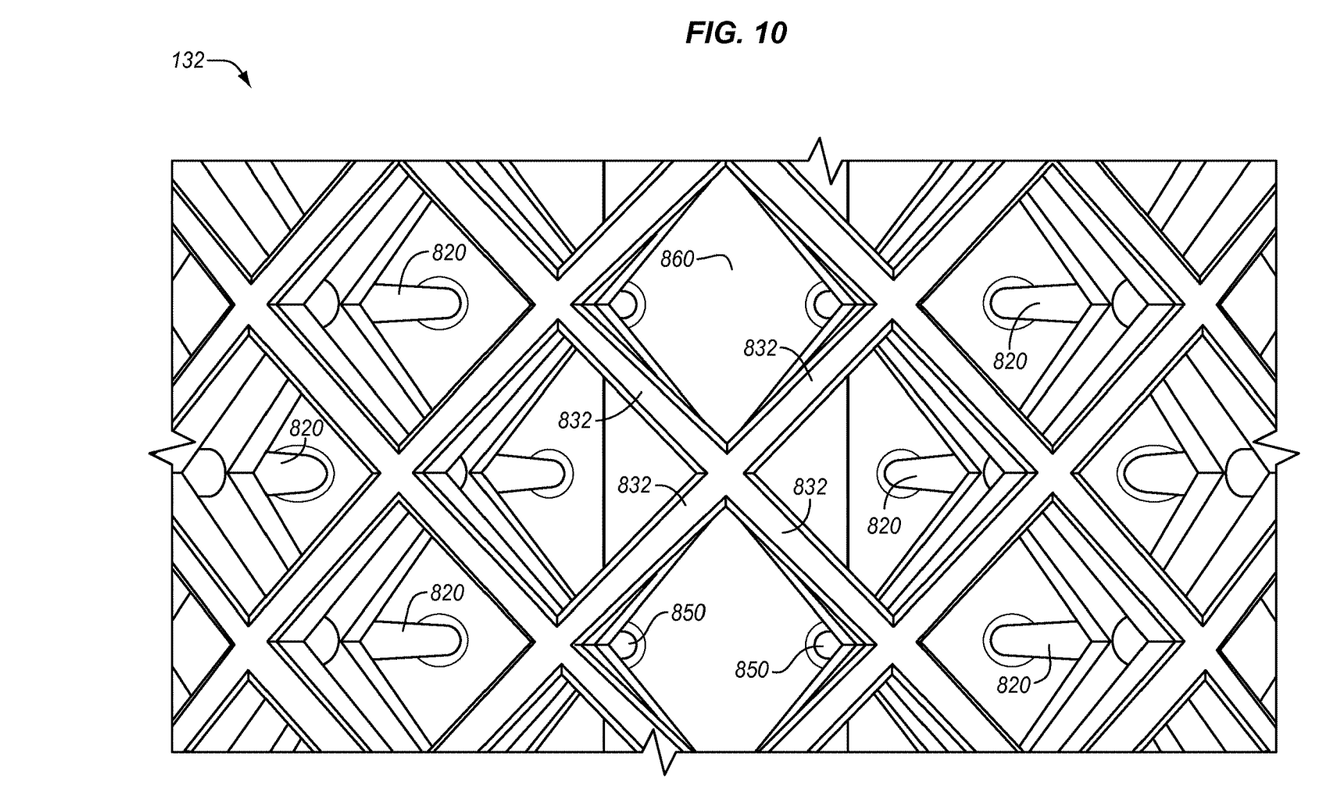
FIG. 10 is a top view of an edge breather in an exemplary embodiment.

FIGS. 7-10 are detailed views of an enhanced edge breather 132, by itself in an exemplary embodiment. Specifically, FIG. 7 is a perspective view, FIG. 8 is a front view, FIG. 9 is a side view, and FIG. 10 is a top view of edge breather 132.

According to FIG. 7, edge breather 132 has an elongated body 133 of length (L) which may vary depending on the characteristics of the product being fabricated. Edge breather also has a width (W). Furthermore, in this embodiment, edge breather 132 defines an open patterned top surface/structure 830 forming an open mesh through which air may freely enter and exit edge breather 132. A rounded end cap 834 is also shown on FIG. 7. End cap 834, by acting to smoothly terminate edge breather 132, reduces the chances that a vacuum bag 120 (e.g., as shown in FIG. 1) will compress and pinch around edge breather 132, potentially rupturing vacuum bag 120.

One or more flow meters 890 may be coupled with edge breather 132, either internally within edge breather 132, or in between edge breathers (e.g., 130, 132, 134, and 136 as shown in FIG. 1). FIG. 8 illustrates a section cut view of edge breather 132 in an exemplary embodiment. Specifically, the view is shown by view arrows 8 of FIG. 7. As shown in FIG. 8, structure 830 has a cross section in the form of an arch. FIG. 8 illustrates that edge breather 132 includes multiple internal rigid support members/pillars 820, that each protrude/project from a base 810. The angle at which each support member 820 projects from base 810 depends on the distance of the support member 820 from an edge 812 of base 810. In short, each support member 820 is angled so that it meets structure 830 at a substantially perpendicular angle to a line that is tangent to structure 830 (and/or surface/structure 840).

Structure 830 is itself rigid, and is made up of multiple rigid lateral/longitudinal members 832 that interweave between support members 820, while structure 840 is made up of multiple lateral members 842 that interconnect support members 820. Lateral members 832 and 842 are fixed to support members 820 at portions 822 which are distal from base 810, as opposed to portions 824 which are proximate to base 810. In short, in one embodiment the radius of the arc defined by structure 830 is greater than the radius of the arc defined by structure 840. The spaces between structures 830 and 840 are subdivided into cells 870, in which excess resin used for curing a part (e.g., part 140) may accumulate within without substantially interfering with airflow through passageways 892 and 894 (into the page and along the length of edge breather 132). As used herein, structures 830 and 840 are described as rigid in that their cross sectional strength against compression is substantial (e.g., capable of resisting 90 PSI loads and substantial heat). That being said, when an edge breather 132 exhibits a geometry that is substantially narrow (e.g., less than half an inch) and substantially long (e.g., many feet), it may still be flexible to some degree along its length.

A wall 860 defines a hollow cylindrical tunnel 864 that runs through/along the length of edge breather 132 (i.e., in a longitudinal direction), proximate to center 814 of base 810. In this embodiment, wiring 862 for a flow meter (e.g., flow meter 890 of FIG. 7) is placed within tunnel 860. The wiring 862 connects flow meters 890 (e.g., in series), enabling measurement of airflow within edge breather 132 at various locations where flow meters are located (e.g., 890). This in turn enables leaks proximate to edge breather 132 to be rapidly located, because a sudden change in flow rates between adjacent flow meters 890 within the same edge breather may indicate that air is unexpectedly entering the system between the adjacent flow meters 890, or that airflow has been cut off somewhere between the adjacent flow meters 890. Projecting from wall 860 are support members 850, which in further embodiments may radiate from wall 860. The angle of each support member 850 and/or 820 ensures that the support member 850/820 experiences column compression and counteracts crushing forces applied to open patterned structure 830 of edge breather 132 during fabrication of a part.

While under load, edge breather 132 distributes forces in a similar manner to a truss or space frame, in that compressing loads are applied to support members 820 and 850, while at least some lateral members 832 and/or 842 receive tensile loads (other lateral members 832 and 842 may be placed in compression). This is, under load at edge breather 132 at least some of lateral members 832 and/or 842 are placed in tension while support members 820 and 850 are placed in compression.

The edge breather 132 shown an illustrated in FIG. 8 is advantageous in that it provides for a lightweight, reusable structure that is capable of resisting crushing forces and high temperatures for extended periods. The lightweight nature of edge breather 132 also ensures that edge breather 132 is more ergonomic to position than prior edge breathers, particularly with regard to large composite parts (e.g., aircraft wings). FIG. 9 illustrates structures 830 and 840, which are substantially open in nature to allow airflow to freely enter edge breather 132 via passageway 892. Structure 830 is not interrupted and is substantially continuous. In contrast, while supports 820 interrupt the continuity of structure 840, which is below structure 830. FIG. 10 is a top view of edge breather 132 illustrating the various components discussed above. The individual features illustrated herein for edge breather 132 may be particularly small. For example, in one embodiment the diameter of each support member 820 is approximately 0.01 inches.

Edge breather 132 may be manufactured via any suitable process, such as via 3D printing, utilizing soluble core fabrication processes, polyjet manufacturing, Stereolithography (SLA), Fused Deposition Modeling (FDM), Selective Laser Sintering (SLS), Selective Laser Melting (SLM), Electronic Beam Melting (EBM), lost wax casting, soluble core molding, etc. For example, in one embodiment, an edge breather (130, 132, 134, 136) is a single integral three dimensional (3D) printed part that is composed of a photopolymer of acrylic urethane. Such an embodiment may be particularly resistant to crushing and therefore may be re-usable in nature. In a still further embodiment, each edge breather (130, 132, 134, 136) comprises base 810, and one or more open structures (830, 840), but does not include any supports 820 or 850. In such an embodiment, each edge breather (130, 132, 134, 136) relies on the compression resistance of the arcing shape of the open structures (830, 840) to resist compression from a vacuum bag (e.g., 120). In yet another further embodiment, tunnel 960 may be absent, and any number of patterns for open structures may be defined for an edge breather (130, 132, 134, 136).

Figure 11:
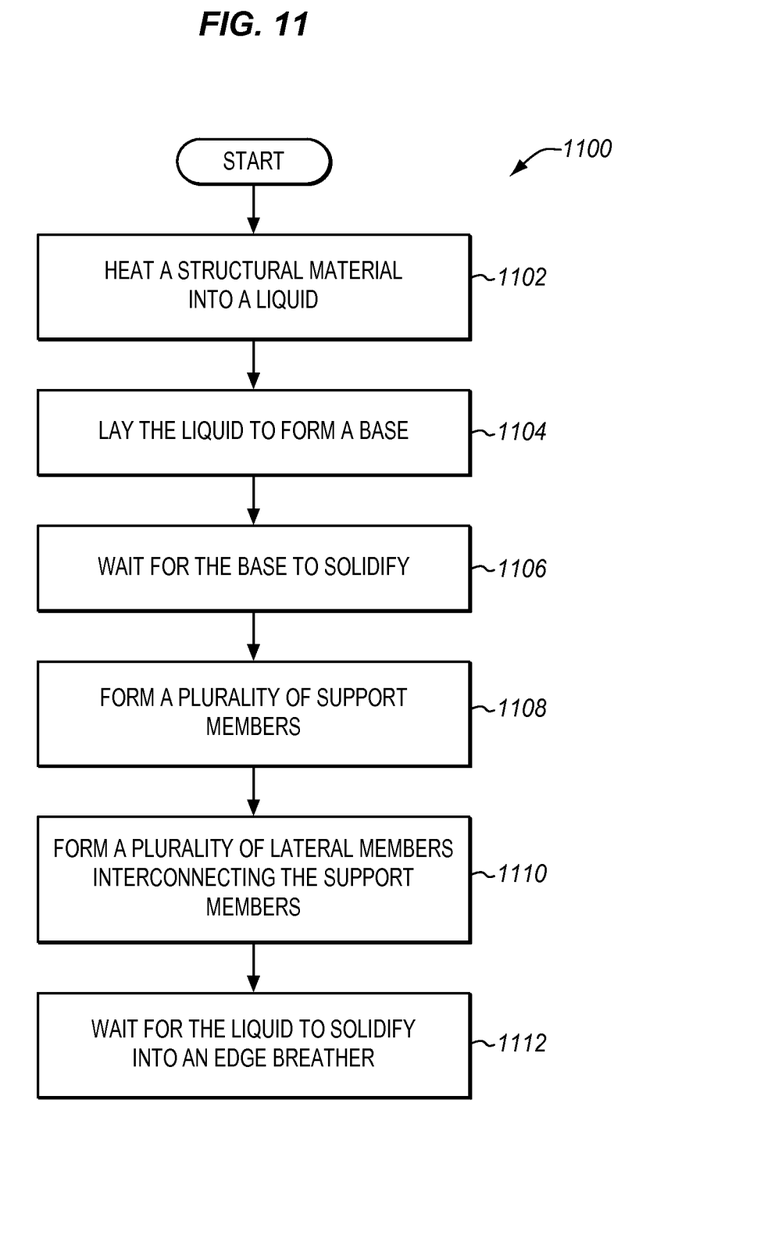
FIG. 11 is flowchart illustrating a method for fabricating an edge breather in an exemplary embodiment.

FIG. 11 illustrates a method 1100 for fabricating an edge breather via 3D printing. For example, method 1100 may be implemented by any suitable 3D printer in order to print one or more edge breathers. The method includes heating a structural material (e.g., a 3D printing material) into a liquid in step 1102, laying the liquid to form a base in step 1104, and waiting for the base to solidify in step 1106. With the base formed, the method continues to step 1108, which comprises laying the liquid iteratively in a pattern to form a plurality of support members protruding from the base, each support member comprising a portion proximate to the base and a portion distal from the base. Step 1110 includes laying the liquid in a pattern to form a plurality of lateral members interconnecting the distal portions of the support members, forming an open patterned structure above the base. Step 1112 includes waiting for the liquid to solidify into a completed edge breather.

Figure 12:
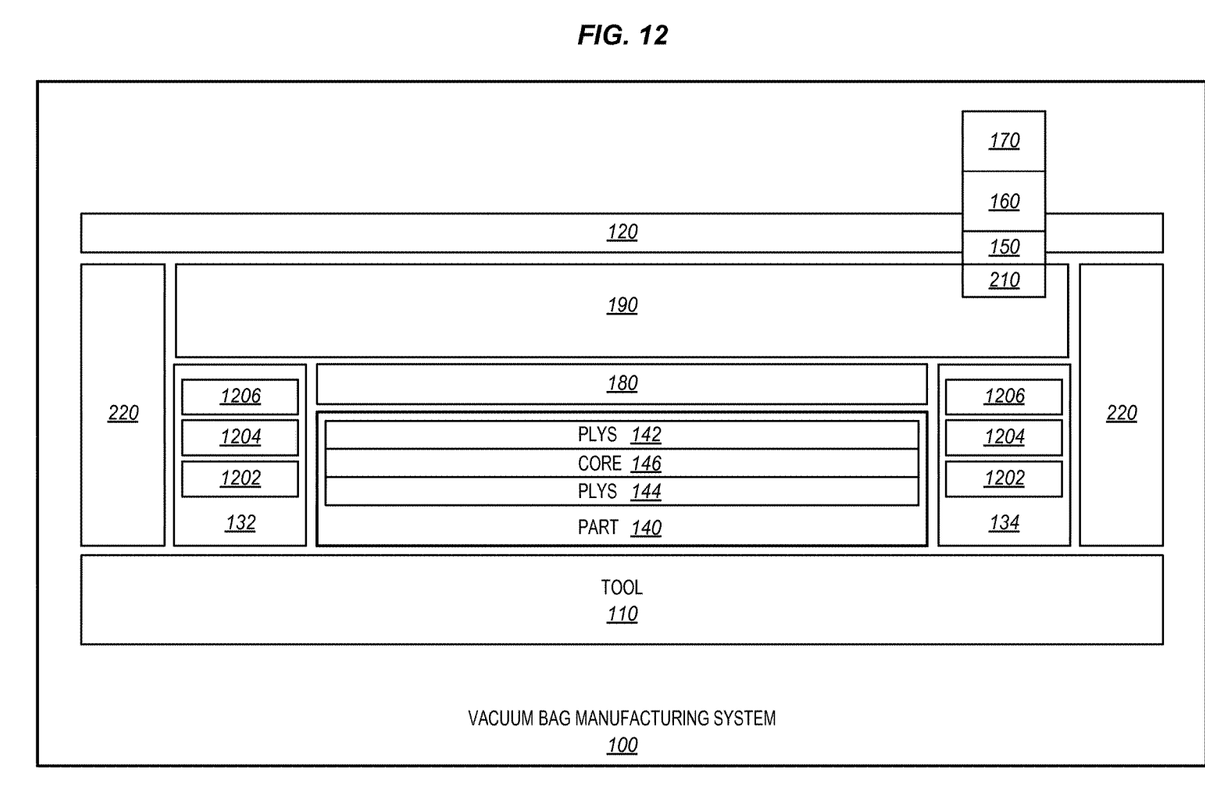
FIG. 12 is a block diagram illustrating a vacuum bag manufacturing system in an exemplary embodiment.

FIG. 12 is a block diagram illustrating a vacuum bag manufacturing system in an exemplary embodiment. As shown in FIG. 12, tool 110 forms a bottom layer of system 100, upon which are placed edge sealant 220, edge breathers 132 and 134, and part 140. Edge breathers 132 and 134 each comprise a base 1202, support members 1204, and lateral members 1206. Part 140 comprises lower layers/plies 144, core 146, and upper layers/plies 142. Part 140 is covered by parting film 180. Atop parting film 180 and edge breathers 130, 132, 134, and 136, sits surface breather 190. Surface breather 190 and the components beneath it are sealed onto tool 110 by vacuum bag 120, which is attached via edge sealant 220 to tool 110. Probe pad 210 provides a small breather channel proximate to fitting 150, to which vacuum hose 160 is attached and penetrates through vacuum bag 120. Vacuum hose 160 is powered by vacuum pump 170.

Figure 13:
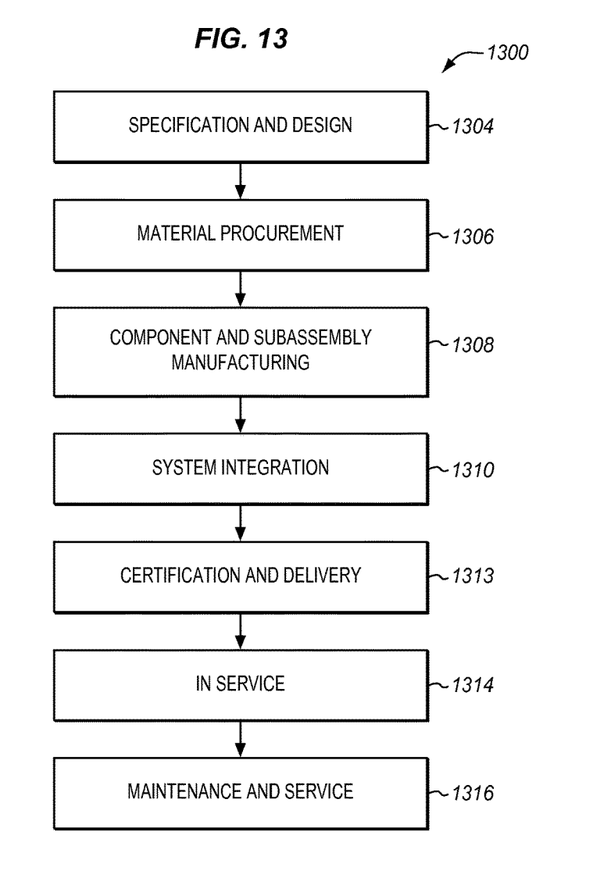
FIG. 13 is a flow diagram of aircraft production and service methodology in an exemplary embodiment.
Figure 14:
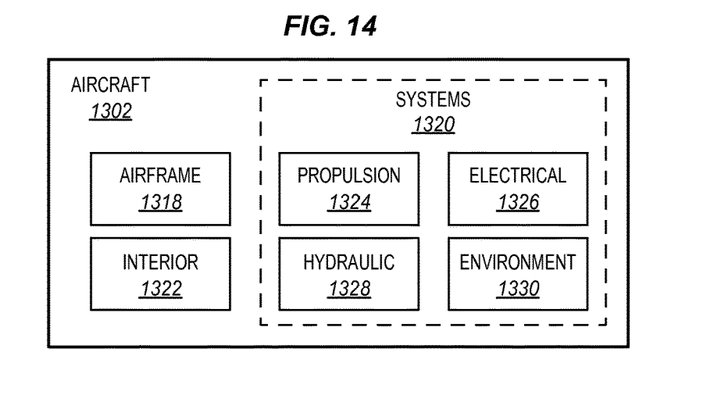
FIG. 14 is a block diagram of an aircraft in an exemplary embodiment.

Referring more particularly to the drawings, embodiments of the disclosure may be described in the context of an aircraft manufacturing and service method 1300 as shown in FIG. 13 and an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on).

In one embodiment, part 140 comprises a portion of airframe 118, and is manufactured during component and subassembly manufacturing 1308 via the use of edge breathers 130, 132, 134, and 136. Part 140 may then be assembled into an aircraft in system integration 1310, and then be utilized in service 1314 until wear renders part 140 unusable. Then, in maintenance and service 1316, part 140 may be discarded and replaced with a newly manufactured part 140. Edge breathers (130, 132, 134, 136) may be utilized throughout component and subassembly manufacturing 1308 in order to manufacture part 140. Edge breathers (130, 132, 134, 136) may even potentially be utilized for maintenance and service 1316 in order to repair or refurbish worn or damaged parts 140.

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1326, and an environmental system 1330. Any number of other systems may be included. Although an aerospace example is shown, the principles of the invention may be applied to other industries, such as the automotive industry.

Apparatus and methods embodied herein may be employed during any one or more of the stages of the production and service method 1300. For example, components or subassemblies corresponding to production stage 1308 may be fabricated or manufactured in a manner similar to components or subassemblies produced while the aircraft 1302 is in service. Also, one or more apparatus embodiments, method embodiments, or a combination thereof may be utilized during the production stages 1308 and 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation, to maintenance and service 1316.

Any of the various operations described herein may be managed/controlled by computer-controllable elements implemented as hardware, software, firmware, or some combination of these. For example, the operations of vacuum pump 170 or a robot arm (not shown) may be controlled by dedicated internal hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
   an edge breather for composite manufacturing, formed of a rigid material and comprising:
   an elongated body having a top open structure with a cross section that defines an arch;
   hollow passageways within the elongated body that are underneath the top structure and travel along a length of the elongated body;
   the top structure defines multiple openings forming an open mesh through which air may enter;

a base;
a plurality of support members protruding from the base, each support member comprising a portion proximate to the base and a portion distal from the base; and
a plurality of lateral members interconnecting the distal portions of the support members, forming the top structure.

2. The edge breather of claim 1, wherein:
the support members are linear and rigid.

3. The edge breather of claim 1, wherein:
the top structure is configured to distribute load to the support members to place the support members in compression, while also distributing load to the lateral members to place at least one of the lateral members in tension.

4. The edge breather of claim 1, wherein:
the top structure arcs over the base.

5. The edge breather of claim 1, wherein:
the support members each protrude at an angle from the base, and the angle of each of the support members is determined based on the proximity of the support member to an edge the base, and the angle of each support member ensures that the support member experiences column compression and counteracts crushing forces applied to the top structure of the edge breather during fabrication of a part.

6. The edge breather of claim 1, further comprising:
a second plurality of lateral members interconnecting distal portions of the support members, forming a second open structure above the base.

7. The edge breather of claim 1, further comprising:
a wall defining a hollow cylindrical tunnel continuing through a center of the base.

8. The edge breather of claim 6, further comprising:
a plurality of support members protruding from the wall.

9. The edge breather of claim 6, further comprising:
a flow meter configured to measure airflow through the edge breather.

10. The edge breather of claim 6, wherein:
the base, support members, and lateral members are integral.

11. The edge breather of claim 1, wherein:
the base, support members, and lateral members are integral, and the edge breather is fabricated via printing from a three dimensional (3D) printer.

12. The edge breather of claim 1, wherein:
the top structure comprises a lattice.

13. The edge breather of claim 1, wherein:
the edge breather is coupled with a vacuum line that draws gases from a curing composite product through the edge breather and into the vacuum line.

14. A composite manufacturing system comprising:
a rigid tool having a surface configured to support a composite material part;
an edge breather atop the rigid tool, comprising:
a base;
a plurality of support members protruding from the base; and
a plurality of lateral members interconnecting portions of the support members that are distal from the base, forming a top structure over the base that defines an arch covering at least one hollow passageway;
a surface breather laid atop the edge breather; and
a vacuum bag sealing the edge breather, the surface breather, and a portion of the tool from surrounding atmosphere.

15. The system of claim 14, wherein:
the support members are linear and rigid.

16. The system of claim 14, wherein:
the support members each protrude at an angle from the base, and the angle of each of the support members is determined based on the proximity of the support member to an edge of the base.

17. The system of claim 14, further comprising:
a second plurality of lateral members interconnecting distal portions of the support members, forming a second top structure above the base.

18. The system of claim 14, wherein the edge breather further comprises:
a wall defining a hollow cylindrical tunnel continuing through a center of the base.

19. The system of claim 18, further comprising:
a plurality of support members protruding from the tunnel.

20. The system of claim 18, further comprising:
a flow meter configured to measure airflow through the edge breather.

21. The system of claim 14, wherein:
the base, support members, and lateral members are integral.

22. The system of claim 14, wherein:
the open patterned structure comprises a lattice.

23. The system of claim 14, wherein:
the top structure is configured to distribute load to the support members to place the support members in compression, while also distributing load to the lateral members to place at least one of the lateral members in tension.

24. A method for fabricating a composite product, comprising:
placing a composite charge on a tool;
locating edge breathers along the perimeter of the composite charge;
creating a vacuum chamber around the charge and edge breathers;
drawing a vacuum in the vacuum chamber; and
drawing gases from the composite charge past support members protruding from a base of the edge breathers and underneath lateral members that are interconnected with portions of the support members which are distal from the base, and which form a top structure over the base that defines an arch covering at least one hollow passageway.

25. The method of claim 24, further comprising:
positioning a surface breather atop the composite charge and the edge breathers.

26. The method of claim 24, further comprising:
curing the composite charge.

27. The method of claim 24 wherein:
drawing gases past the support member comprises drawing gases past a plurality of support members that each protrude from the base and support an open patterned structure.

28. The method of claim 27 wherein:
the edge breathers exhibit an arch shaped cross-section through which gases may freely enter or exit the edge breathers.

29. The method of claim 24, further comprising:
applying a parting film atop the composite charge.

30. The method of claim 24, further comprising:
placing the support member of an edge breather in compression while placing a lateral member of the edge breather in tension, when drawing a vacuum in the vacuum chamber.

31. A method for fabricating an edge breather, comprising:
heating a structural material into a liquid;
laying the liquid to form a base;
waiting for the base to solidify;
laying the liquid iteratively in a pattern to form a plurality of support members protruding from the base, each support member comprising a portion proximate to the base and a portion distal from the base;
laying the liquid in a pattern to form a plurality of lateral members interconnecting the distal portions of the support members, forming an open patterned structure above the base that defines an arch covering at least one hollow passageway; and
waiting for the liquid to solidify into a completed edge breather.

\* \* \* \* \*